US010791183B1

(12) United States Patent
Gallagher et al.

(10) Patent No.: US 10,791,183 B1
(45) Date of Patent: Sep. 29, 2020

(54) MANAGING CONTACT WHILE NAVIGATING

(71) Applicant: International Business Machines Corporation, Armonk, NY (US)

(72) Inventors: Aiden J. Gallagher, Winchester (GB); Christopher Phillips, Woolston (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/412,472

(22) Filed: May 15, 2019

(51) Int. Cl.
*H04L 29/08* (2006.01)
*H04L 12/58* (2006.01)
*G01C 21/34* (2006.01)
*H04W 4/021* (2018.01)

(52) U.S. Cl.
CPC .......... *H04L 67/18* (2013.01); *G01C 21/3492* (2013.01); *H04L 51/046* (2013.01); *H04L 51/24* (2013.01); *H04L 51/38* (2013.01); *H04W 4/021* (2013.01)

(58) Field of Classification Search
CPC ....... H04L 67/18; H04L 51/046; H04L 51/24; H04L 51/38; G01C 21/3492; H04W 4/021
USPC ...................................................... 455/456.1
See application file for complete search history.

(56) References Cited

U.S. PATENT DOCUMENTS

| 8,897,822 | B2* | 11/2014 | Martin | H04W 4/12 |
| | | | | 455/466 |
| 2014/0295808 | A1* | 10/2014 | Ely | H04M 1/2746 |
| | | | | 455/414.1 |
| 2015/0148061 | A1* | 5/2015 | Koukoumidis | H04W 4/022 |
| | | | | 455/456.1 |
| 2015/0271324 | A1 | 9/2015 | Janakiraman et al. | |
| 2016/0227028 | A1* | 8/2016 | Chan | H04M 3/432 |
| 2017/0223168 | A1 | 8/2017 | Singh et al. | |

FOREIGN PATENT DOCUMENTS

KR           101274571 B1 *  6/2013

OTHER PUBLICATIONS

Mell et al., "The NIST Definition of Cloud Computing", Recommendations of the National Institute of Standards and Technology, Sep. 2011, 7 pages.

* cited by examiner

*Primary Examiner* — Khai M Nguyen
(74) *Attorney, Agent, or Firm* — James L. Olsen

(57) ABSTRACT

Aspects of the present disclosure relate to managing contact received by a user traveling to a geofence. Contact can be received from a contacting entity at a device of a user while the user is traveling to a geofence, the geofence being a virtual boundary defining a destination. A determination can be made whether the user enters the geofence. In response to a determination that the user enters the geofence, a follow-up action can be executed.

20 Claims, 8 Drawing Sheets

MANAGING CONTACT WHILE NAVIGATING

BACKGROUND

The present disclosure relates generally to the field of navigation.

Navigation systems enable users to conveniently route from a starting point to a destination. Navigation systems typically utilize satellite technology to calculate routes based on paths available to a user. These systems allow users to focus on driving without the burden of manually navigating (e.g., reading a map and/or referencing a compass) to their destination.

SUMMARY

Embodiments of the present disclosure include a method for managing contact received while navigating. Contact can be received at a user device of a user from a contacting entity while the user is traveling to a geofence, the geofence being a virtual boundary defining a destination. A priority level of the contacting entity can be determined. The contacting entity can be added to a contacting entity queue based on the priority level. A determination can be made that the user enters the geofence. In response to determining that the user enters the geofence, a determination can be made whether the contacting entity is a next contacting entity in the contacting entity queue. In response to determining that the contacting entity is the next contacting entity in the contacting entity queue, a follow-up action can be executed to the contacting entity.

Embodiments of the present disclosure include a computer program product for managing contact received while navigating. Contact can be received at a user device of a user from a contacting entity while the user is traveling to a geofence, the geofence being a virtual boundary defining a destination. A determination can be made whether a threshold is satisfied, the threshold dictating a condition required to trigger a follow-up notification prior to the user arriving at the geofence. In response to determining that the threshold is satisfied, the follow-up action can be transmitted to the contacting entity. A determination can be made whether the user enters the geofence. In response to determining that the user enters the geofence, a follow-up action can be executed.

Embodiments of the present disclosure further include a system for managing contact received while navigating. A first device of a user can be communicatively coupled to a second device of a contacting entity. The first device of the user can be configured to perform a method. The method can include receiving, at the first device, contact from the second device while the user is traveling to a geofence, the geofence being a virtual boundary defining the destination. The method can further include prompting, by the first device, the contacting entity of the second device regarding a desired follow-up. The method can further include receiving an indication of the desired follow-up from the second device. The method can further include determining whether a follow-up criterion for executing the desired follow-up is satisfied. In response to determining that the follow-up criterion for executing the desired follow-up is satisfied, the desired follow-up can be executed.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
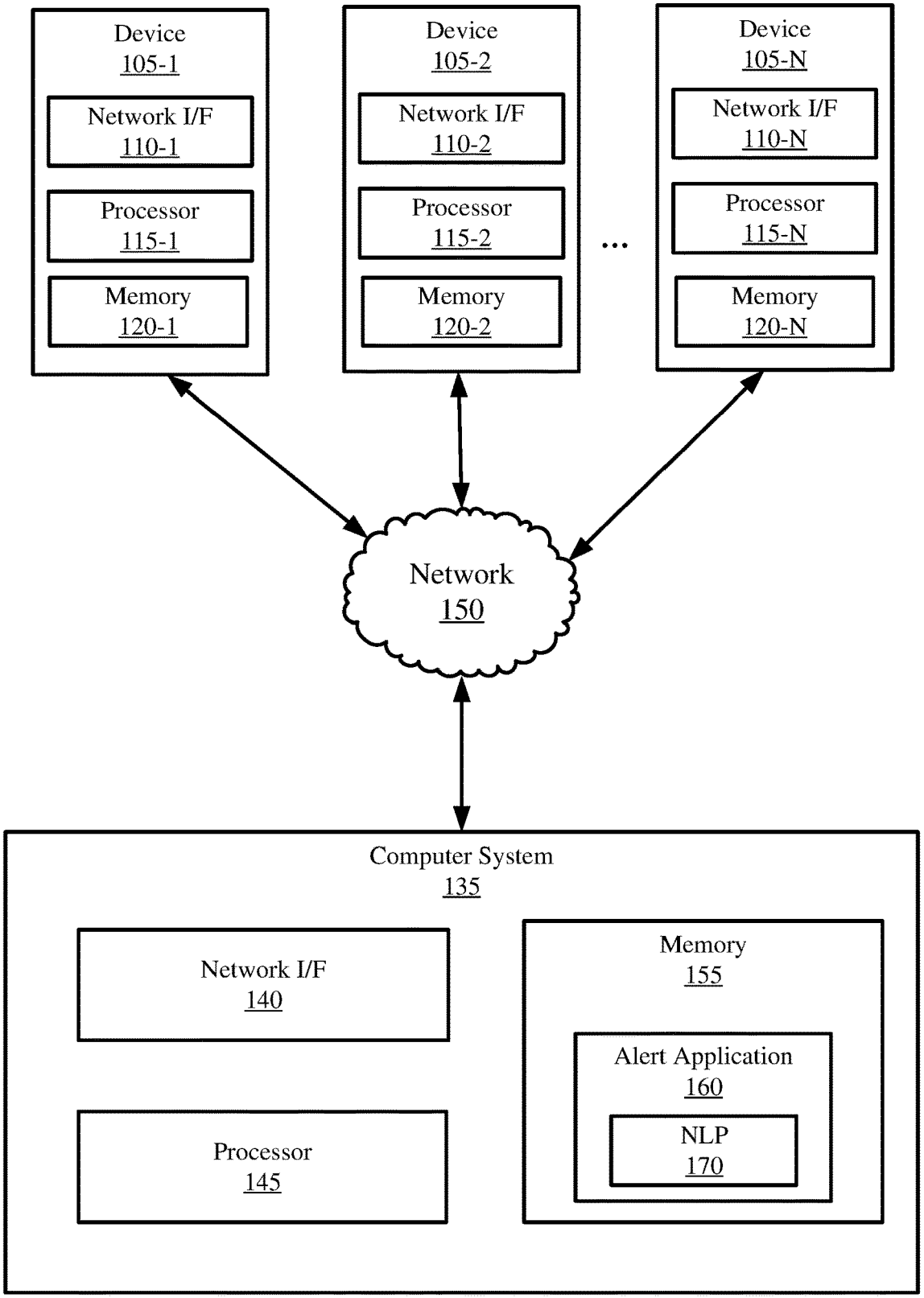
FIG. 1 is a block diagram illustrating a computing environment in which illustrative embodiments of the present disclosure can be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of navigation. While the present disclosure is not necessarily limited to such applications, various aspects of the disclosure can be appreciated through a discussion of various examples using this context.

Individuals are often distracted by contact (e.g., calls, texts, emails, etc.) received while operating vehicles. This can be caused by the individual responding to the contact or simply by an alert triggered by the contact (e.g., vibrations, tones, etc.). These distractions can be dangerous, causing accidents, injuries, or even fatalities. These dangerous distractions are increasingly common as a result of the increase of wireless connectivity (e.g., wireless headsets, wearables, etc.), which enables users to engage in distracting behavior while operating vehicles.

Aspects of the present disclosure address the aforementioned issues by managing contact received by a user while the user is traveling. Contact can be received from a contacting entity while a user is traveling to a geofence defining a destination. A notification indicating the user's availability can be transmitted to the contacting entity in response to receiving the contact. A determination can then be made whether the user enters the geofence. If a determination is made that the user enters the geofence, then a follow-up action (e.g., a call, text, or email following up with the contacting entity) can be executed.

Figure 3:
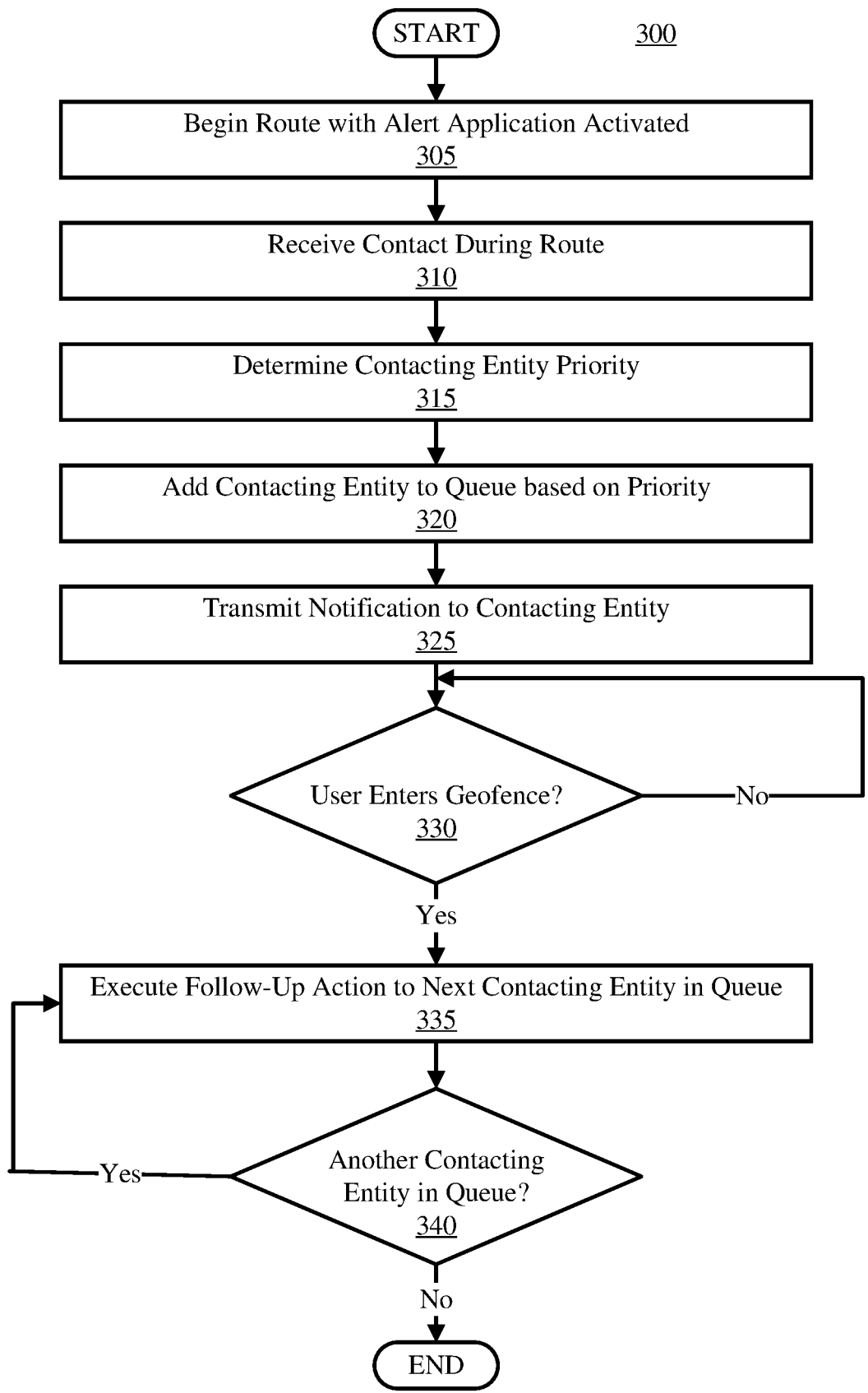
FIG. 3 is a flow diagram illustrating an example method for managing contact received while a user is traveling by prioritizing multiple contacting entities, in accordance with embodiments of the present disclosure.

In some embodiments, multiple entities which attempt to contact the user traveling to the geofence can be prioritized, to be discussed in further detail in FIG. 3. In some embodiments, multiple follow-ups can be transmitted to a contacting entity along the user's route, to be discussed in further detail in FIG. 4. In some embodiments, the contacting entity can be prompted regarding a desired follow-up, to be discussed in further detail in FIG. 5.

Ultimately, aspects of the present disclosure allow users to navigate routes without being distracted by contact, such as calls, text messages, alerts, notifications, and emails. Further, aspects of the present disclosure allow users to inform individuals regarding their current status (e.g., location, speed, estimated time of arrival (ETA) to the destination, distance from the destination, etc.) upon being contacted, without having to manually respond. Further still, aspects of the present disclosure enable convenient follow up with contacting entities at a time suitable for the traveling user.

Turning now to the Figures, FIG. 1 is a block diagram of an example computing environment 100 in which illustrative embodiments of the present disclosure can be implemented. Computing environment 100 includes a plurality of devices 105-1, 105-2 . . . 105-N (collectively referred to as devices 105), at least one computer system 135, and a network 150.

The devices 105 and the computer system 135 include one or more processors 115-1, 115-2 . . . 115-N (collectively referred to as processors 115) and 145 and one or more memories 120-1, 120-2 . . . 120-N (collectively referred to as memories 120) and 155, respectively. The devices 105 and the computer system 135 are configured to communicate with each other through internal or external network interfaces 110-1, 110-2 . . . 110-N (collectively referred to as network interfaces 110) and 140. The network interfaces 110 and 140 are, in some embodiments, modems or network interface cards. The devices 105 and/or the computer system 135 can be equipped with a display or monitor. Additionally, the devices 105 and/or the computer system 135 include optional input devices (e.g., a keyboard, mouse, scanner, video camera, global positioning system (GPS), etc.), and/or any commercially available or custom software (e.g., browser software, communications software, server software, natural language processing software, search engine and/or web crawling software, mapping and navigation software, etc.). The devices 105 and/or the computer system 135 can be servers, desktops, laptops, autonomous mobile devices, or hand-held devices (e.g., smart phones, wearables, or tablets associated with users).

The devices 105 and the computer system 135 can be distant from each other and communicate over the network 150. In some embodiments, the computer system 135 can be a central hub from which devices 105 can establish a communication connection, such as in a client-server networking model. Alternatively, the computer system 135 and devices 105 can be configured in any other suitable networking relationship (e.g., in a peer-to-peer (P2P) configuration or using any other network topology).

The network 150 can be implemented using any number of any suitable communications media. For example, the network 150 can be a wide area network (WAN), a local area network (LAN), an Internet, or an intranet. In certain embodiments, the devices 105 and the computer system 135 can be local to each other and communicate via any appropriate local communication medium. For example, the devices 105 and the computer system 135 can communicate using a local area network (LAN), one or more hardwire connections, a wireless link (e.g., Bluetooth®) or router, or an intranet. In some embodiments, the devices 105 and the computer system 135 can be communicatively coupled using a combination of one or more networks and/or one or more local connections. For example, the first device 105-1 (e.g., a GPS device) can be hardwired to the computer system 135 (e.g., connected with an Ethernet cable) while the second device 105-2 (e.g., a mobile phone) can communicate with the computer system 135 using a wireless link, such as Bluetooth.

In some embodiments, the network 150 is implemented within a cloud computing environment or using one or more cloud computing services. Consistent with various embodiments, a cloud computing environment can include a network-based, distributed-data processing system that provides one or more cloud computing services. Further, a cloud computing environment can include many computers (e.g., hundreds or thousands of computers or more) disposed within one or more data centers and configured to share resources over the network 150.

The computer system 135 includes an alert application 160. The alert application 160 can be provisioned over the network to, or installed over the network on, the devices 105. Provisioning the software over the network can be completed such that installation on the devices 105 is not necessary.

In embodiments, the alert application 160 is configured to automatically manage incoming contact (e.g., emails, texts, push notifications, calls, etc.) received while a user is traveling (e.g., driving a car, driving a boat, flying a plane, riding a bike, etc.). This can be completed in a variety of manners, to be discussed in detail with reference to FIGS. 2-5. In embodiments, the alert application 160 can be configured to perform mapping and navigation functions (e.g., by utilizing GPS or other satellite technology) to obtain routing information. Alternatively, the alert application 160 can be configured to utilize existing navigation and mapping services of one or more devices (e.g., of the computer system 135 or devices 105) or applications to obtain routing information. Routing information includes calculated routes (e.g., paths from a starting location to a destination), time of arrival from a starting location to a destination, time of arrival from a current location to a destination, distance from a starting location to a destination based on a route, distance from a current location to a destination, destination geofence data (e.g., an area which constitutes a "destination"), relevant rules and regulations for paths along the route (e.g., speed limits, signage, etc.), and other routing information.

In some embodiments, the alert application 160 can be configured to notify a contacting entity (e.g., a person or device) when a traveling user (e.g., a user utilizing a navigation service attempting to reach a destination from a starting location) arrives at their destination (e.g., enters a geofence defining the destination according to their navigation service). For example, a user utilizing the alert application 160 may be in route to a destination defined by a geofence. The user may then receive contact (e.g., a call, text, email, or other notification) from an entity. The alert application 160 can then transmit a notification regarding the user's availability (e.g., "I am currently driving"). Upon entering the geofence defining the destination, the alert application 160 can then be configured to follow up (e.g., call back, send a message indicating availability, transmit a voicemail, etc.) with the entity that attempted to contact the traveling user.

In some embodiments, the alert application 160 can be configured to prioritize several contacting entities. Prioritization can be used when determining the order in which contacting entities are followed up with. In some embodiments, this can be completed based on manual input from a user (e.g., a user manually classifies priorities of contacting identities). For example, the user can classify family members (e.g., based on their phone numbers or emails) as high priority and all others as low priority. In some embodiments, the prioritization can be completed automatically by parsing the content of the communication using a natural language processor 170. Upon reaching the geofence defining the destination, the alert application 160 can then be configured to follow up with the contacting entities according to the prioritization scheme.

In some embodiments, the alert application 160 can be configured to follow up with a contacting entity at various milestones along the user's travel. One or more thresholds can be used to dictate when follow up actions are issued by the alert application 160. For example, the alert application 160 can be configured to follow up with a contacting entity regarding the user's location, speed, and/or estimated time of arrival (ETA) based the distance and/or time from the geofence defining the destination.

In some embodiments, the alert application 160 can be configured to prompt a contacting entity to specify a desired follow-up. For example, upon receiving a call, the alert application 160 can be configured to provide the contacting entity options for how they would like to be followed up with. These options can include the type of communication they would like to receive (e.g., a call, text, email, etc.), the time they would like to receive the communication (e.g., upon reaching the destination, 5 minutes prior to arriving at the destination, etc.), and the content of the communication (e.g., arrival time).

Reference will now be made to various methods and techniques for analyzing natural language content (e.g., syntactic analysis, semantic analysis, part of speech tagging, etc.) which can be performed by the natural language processor 170. The natural language processor 170 can be configured to recognize and analyze any number of natural languages. In embodiments, the natural language processor 170 can be configured to parse passages of text (e.g., voice mail transcripts, emails, text messages, etc.). The natural language processor 170 can include functionalities including tokenization, part-of-speech tagging, slot name tagging, feature tagging, semantic relationship identification, and/or syntactic relationship identification.

In some embodiments, the natural language processor 170 can be configured to perform lexical analysis. The natural language processor 170 can convert a sequence of characters into a sequence of tokens. A token can be a string of characters included in an electronic input document and categorized as a meaningful symbol. Further, in some embodiments, the natural language processor 170 can identify word boundaries and can break text passages into their component text elements, such as words, multiword tokens, numbers, and punctuation marks. In some embodiments, the natural language processor 170 can receive a string of characters, identify the lexemes in the string, and categorize them into tokens.

Consistent with various embodiments, the natural language processor 170 can be configured to markup words in passages to correspond to particular parts of speech, slot names, and/or features. The natural language processor 170 can ingest a passage or other text in natural language and assign a part of speech, slot name, and/or feature to each word or other token. The alert application 160 can determine the part of speech, slot name, and/or feature to which a word (or other text element) corresponds based on the definition of the word and the context of the word. The context of a word can be based on its relationship with adjacent and related words in a phrase, sentence, or paragraph. In some embodiments, the context of a word can be dependent on one or more previously analyzed data inputs (e.g., the context of a word in a dictionary can describe or bring further meaning to a word or phrase in an encyclopedia). In embodiments, the output of the alert application 160 can populate a text index, a triplestore, or a relational database (RDB) to enhance the contextual interpretation of a word or term.

Examples of parts of speech that can be assigned to words include, but are not limited to, nouns, verbs, adjectives, adverbs, and the like. Examples of other part of speech categories that natural language processor 170 can assign include, but are not limited to, comparative or superlative adverbs, wh-adverbs, conjunctions, determiners, negative particles, possessive markers, prepositions, wh-pronouns, qualifiers, modal verbs, subject infinitives, and the like. Examples of slot names include, but are not limited to, top, subject (subj), indirect object (iobj), direct object (obj), predicate complement (pred), auxiliary complement (auxcomp), complement (comp), n-nouns, n-adjectives, and the like. Examples of features include, but are not limited to, verb features (e.g., sayv (verb of saying), sta (stative verb), yen (past principle), vfin (finite verb), vfut (future tense), vind (indicates mood), ving (present participle), vpast (past tense), etc.), noun features (e.g., acc (accusative), cn (common noun), dy (day), f (feminine), h (human), indef (indefinite pronoun), etc.) adjective features (e.g., adjnoun, comp (comparative), superl (superlative), etc.), adverb features, determiner features, qualifier features, and preposition features. In some embodiments, the natural language processor 170 can tag or otherwise annotate tokens of a passage with part of speech, slot name, and feature categories.

In some embodiments, the natural language processor 170 can be configured to identify semantic relationships of recognized text elements (e.g., words, phrases) in documents. In some embodiments, the natural language processor 170 can determine functional dependencies between entities and other semantic relationships.

Consistent with various embodiments, the natural language processor 170 can be configured to identify syntactic relationships in a passage composed of tokens. The alert application can determine the grammatical structure of sentences such as, for example, which groups of words are associated as phrases and which word is the subject or object of a verb.

In embodiments, the natural language processor 170 can be configured to perform sentiment analysis on natural language content (NLC). For example, the natural language processor 170 may identify words associated with one or more emotions (e.g., the word "ecstatic" may be associated with "happiness," the word "uncertain" may be associated with "confused," or vice versa). In some embodiments, the natural language processor 170 can be configured to extract sentiment key words from voice mail transcripts, text messages, emails, and the like, and assign an associated sentiment (e.g., angry, happy, calm, flustered, sad, etc.) to the overall text (e.g., or user associated with the text). This can be used to aid in prioritizing between various contacting entities by the alert application 160.

The output of the natural language processor 170 can be used to prioritize between contacting entities by the alert application 160. For example, priority values can be assigned to contacting entities based on the sentiment associated with each contacting entity's communication (e.g., an individual with an "angry" or "impatient" sentiment may be assigned a higher priority than an individual with a "relaxed" or "calm" sentiment). As another example, priority values can be assigned to contacting entities by using a word bank that maps particular words to priority levels.

While FIG. 1 illustrates a computing environment 100 with a single computer system 135, suitable computing environments for implementing embodiments of this disclosure can include any number of computer systems. The various models, modules, systems, and components illustrated in FIG. 1 can exist, if at all, across a plurality of computer systems and devices. For example, some embodiments can include two computer systems. The two computer systems can be communicatively coupled using any suitable communications connection (e.g., using a WAN, a LAN, a wired connection, an intranet, or the Internet).

It is noted that FIG. 1 is intended to depict the representative major components of an example computing environment 100. In some embodiments, however, individual components can have greater or lesser complexity than as represented in FIG. 1, components other than or in addition to those shown in FIG. 1 can be present, and the number, type, and configuration of such components can vary. Thus, the configuration of the system can vary, and aspects of the present disclosure are not limited to any particular arrangement described.

Figure 2:
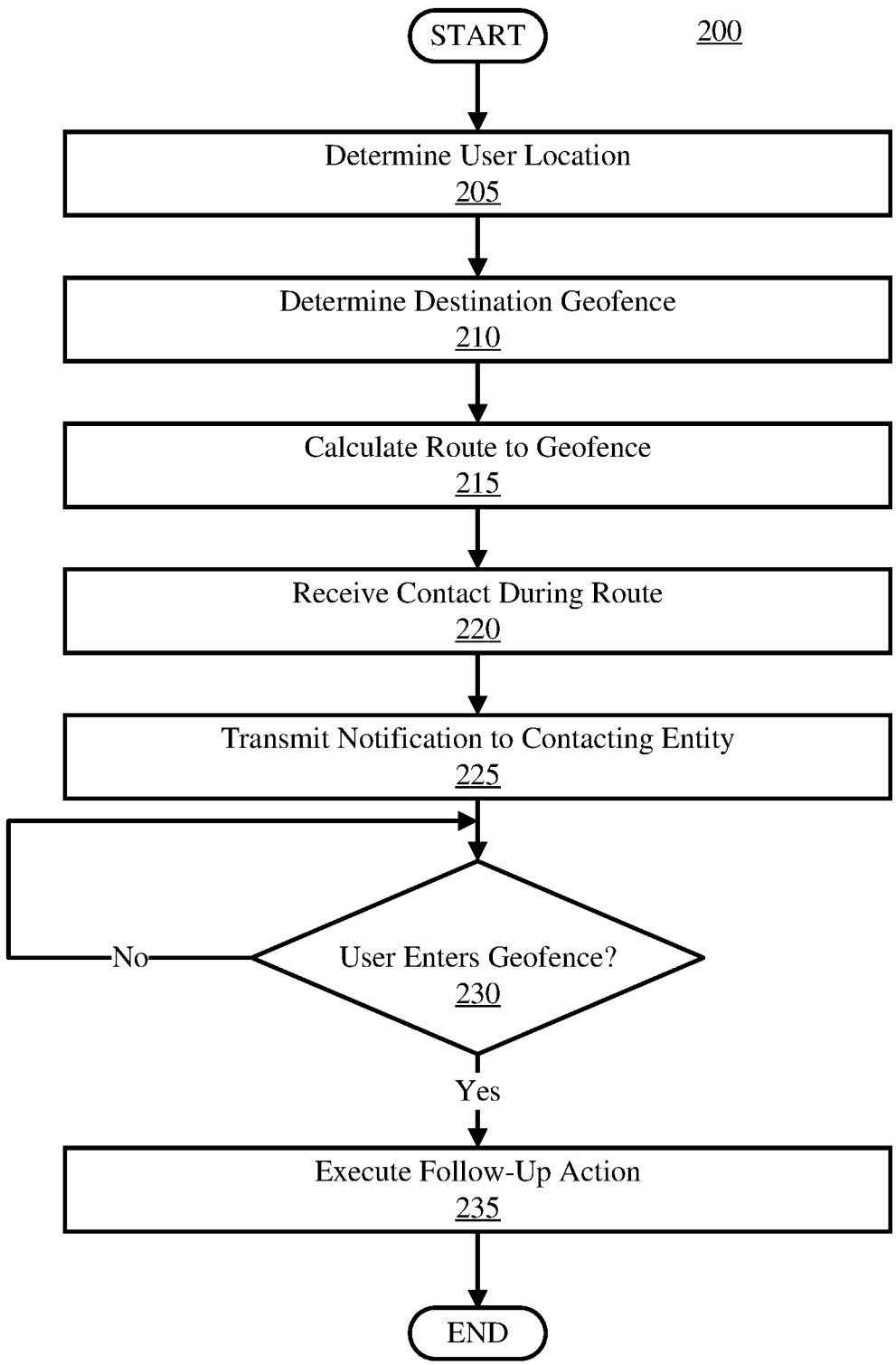
FIG. 2 is a flow diagram illustrating an example method for managing contact received while a user is traveling, in accordance with embodiments of the present disclosure.

Referring now to FIG. 2, shown is a flow-diagram illustrating an example method for managing contact (e.g., calls, texts, emails, or other notifications) received while a user is traveling to a destination, in accordance with embodiments of the present disclosure.

Method 200 initiates at operation 205, where a user location determined. The user location can be determined using mapping and navigation techniques (e.g., capabilities inherent to, or utilized by, an alert application, such as the alert application 160 depicted in FIG. 1). For example, GPS technology can be configured to determine a physical location (e.g., latitude and longitude coordinates) associated with the user.

A destination geofence is then determined. This is illustrated at operation 210. The geofence is a virtual boundary defining the destination. The geofence can be automatically or manually generated. In some embodiments, a particular size and shape perimeter can automatically be generated around GPS coordinates (e.g., latitude and longitude) of a location associated with the destination. For example, a 25 meter radius circle can be generated around GPS coordinates associated with the destination. In this example, the 25 meter radius circle is the geofence. In some embodiments, the geofence can be sized and shaped to accommodate the approximate perimeter of the destination (e.g., manually or automatically based on sensor data). For example, the geofence can be sized and shaped based on the perimeter of a state park, an auditorium, a restaurant, a residential property, a hotel, a waterpark, etc. The geofence can either be physically mapped by a user or automatically mapped based on data collected from one or more sensors (e.g., visual sensors, map data, etc.).

A route from the user location to the geofence is then calculated. This is illustrated at operation 215. The route can be calculated using mapping and navigation techniques. For example, updated mapping and navigation data including the location of roads, speed on roads, real-time traffic, etc. can be considered to calculate a route from the user location to the geofence. The route can be the fastest route, a route considering a particular detour, a route avoiding particular roads, etc. Upon calculation of the route, the user can begin travel to the destination geofence.

Contact is then received during the route. This is illustrated at operation 220. Contact can include texts, calls, notifications, emails, etc. The contact can be received by a human or machine. The contact can be received by a device of the traveling user (e.g., the user's mobile device).

A notification is then transmitted to the contacting entity (e.g., the human or machine that contacted the traveling user). This is illustrated at operation 225. The notification can include details regarding the user's availability (e.g., "I'm driving," "I am busy and cannot answer the phone," etc.). In some embodiments, the notification transmitted to the contacting entity can include specific routing information, such as the distance to the user's destination, the estimated time of arrival (ETA) to the user's destination, the user's current speed, the time the user has been traveling, etc. In embodiments, the notification can include an indication that the contacting entity should re-contact the user upon arrival to the destination, including an indication of when the user will reach the destination. In some embodiments, the notification can include an indication that the traveling user will follow up with the contacting entity.

In embodiments, prior to transmitting the notification, the contact is intercepted and blocked, or alternatively, suppressed. This is completed such that the user is not distracted while traveling. The notification can then be automatically transmitted thereafter.

A determination is then made whether the user enters the geofence. This is illustrated at operation 230. This can be completed by determining whether the location (e.g., coordinates) of the user enter the virtual boundary defining the geofence (e.g., according to a navigation system). If a determination is made that the user has not entered the geofence, then operation 230 commences (e.g., the determination whether the user enters the geofence is continually or intermittently performed).

If a determination is made that the user enters the geofence, then a follow-up action is executed. This is illustrated at operation 235. Follow-up actions can include messages, calls, texts, notifications, and the like. The follow-up action is transmitted to the contacting entity, for example, to alert the contacting entity that the traveling user has reached their destination. In some embodiments, the follow-up action includes an indication that the user is now available. In some embodiments, the type of follow-up action can mirror the type of contact received during the route. For example, if a contacting entity calls the user while traveling, then the follow-up action can include a call. Similarly, if a contacting entity texts the user while traveling, then the follow-up action can include a text message. Upon following up with the contacting entity, method 200 ends.

The aforementioned operations can be completed in any order and are not limited to those described. Additionally, some, all, or none of the aforementioned operations can be completed, while still remaining within the spirit and scope of the present disclosure.

Referring now to FIG. 3, shown is a flow diagram of an example method 300 for managing contact received while in route to a destination by prioritizing contacting entities, in accordance with embodiments of the present disclosure.

Method 300 initiates at operation 305, where a route is initiated while an alert application (e.g., alert application 160 of FIG. 1) is activated. When the alert application is in an active state, it may collect routing information, including, but not limited to, the location of the traveling user, the geofence of the destination the user is traveling to, paths from the user to the geofence, the ETA from the user to the geofence, the distance from the user to the geofence, and traffic data.

Contact is then received during the route. This is illustrated at operation 310. This can be substantially similar to the contact received at operation 220 of FIG. 2.

A priority of the contacting entity is then determined. This is illustrated at operation 315. In embodiments, the priority of various contacting entities can be predefined within the alert application. For example, a user can manually define a priority level associated with each phone number, email, contact name, etc. within the alert application. The defined priority can be numerical or descriptive. For example, a priority scale can range from 1-10 with 1 being a low priority and 10 being a high priority, or alternatively, a priority scale can include descriptive priority labels such as "low," "medium," and "high." As an example, a user can define the priority of family members as high (e.g., 10 or "high" in the example discussed above), the priority of business associates as medium (e.g., 5 or "medium" in the example discussed above), and the priority of friends as low (e.g., 1 or "low" in the example discussed above).

In some embodiments, if a particular number, contact name, or email is not registered within the alert application, a default priority level can be assigned. For example, in embodiments, unknown numbers can automatically be assigned the lowest priority level.

In embodiments, the priority of a contacting entity can be dynamically determined. For example, the priority can be determined based on the content of the received communication. As an example, if the contacting entity transmits a voice mail, email, and/or message to the traveling individual, the content of the voice mail, email, and/or message can be analyzed using NLP techniques (e.g., described with respect to the natural language processor 170 of FIG. 1) to determine the priority of the contact.

In some embodiments, a data structure (e.g., a table, word bank, etc.) storing words and corresponding priority levels can be referenced to determine the priority of a contacting entity. For example, words such as "emergency," "urgent," "hospital," and "help" may be assigned high priority, words such as "deadline," "meeting," and "transaction" may be assigned medium priority, and words such as "concert," "soccer," and "beach" may be assigned low priority. In this example, if a first contacting entity transmits a text message "I need your help as soon as possible," the first contacting entity can be assigned a high priority based on the observation of the word "help." Similarly, if a second contacting entity leaves a voicemail including the sentence "The deadline of the project is 12 PM tomorrow," the second contacting entity can be assigned a medium priority based on the observation of the word "deadline." As another example, if a third contacting entity transmits an email to the user reciting "Are you able to make the concert on Friday?", then the third contacting entity can be assigned a low priority based on the observation of the word "concert." It is noted that the preceding word to priority level mapping is merely exemplary and any suitable word to priority level mapping can be completed.

In some embodiments, contacting entities can be prioritized according to a sentiment analysis (e.g., performed by a natural language processor, such as natural language processor 170 of FIG. 1). For example, words associated with one or more emotions can be identified within the communication received from contacting entities. These words can be extracted and used to determine an overall sentiment of content received from each contacting entity. For example, assume a voice mail transcript includes the sentence: "I am frustrated that you are not answering or returning my call." In this example, the word "frustrated" can be associated with an overall upset sentiment. Each sentiment can be mapped to a corresponding priority and assigned to each contacting entity. Following the example above, if an upset sentiment is mapped to a high priority, then the contacting entity can be assigned a relatively high priority.

Ultimately, an overall sentiment can be determined for each contacting entity based on a sentiment analysis of the NLC transmitted by each contacting entity. Each sentiment can be mapped to a particular priority and each contacting entity can be assigned a priority based on the sentiment of their NLC. As an example, a first sentiment (e.g., angry) associated with NLC from a first contacting entity can be ascertained while a second sentiment (e.g., calm) associated with NLC from a second contacting entity can be ascertained. The first and second sentiments can be mapped to a first and second priority level, respectively, and the first contacting entity can be assigned the first priority level (e.g., angry can be mapped to a high priority level), while the second contacting entity can be assigned the second priority level (e.g., calm can be mapped to a low priority level). The first and second contacting entities can then be prioritized by comparing the first and second priority levels (e.g., the first contacting entity can be prioritized above the second contacting entity assuming the sentiment "angry" has a higher priority than the sentiment "calm").

In some embodiments, the priority of the contacting entity can be determined according to the type of communication (e.g., call, text, or email) received from the contacting entity. For example, a first contacting entity which called the traveling user can be assigned a high priority, a second contacting entity which texted the user can be assigned a medium priority, and a third contacting entity which emailed the traveling user can be assigned a low priority.

In embodiments, multiple factors can contribute to the priority determined for a contacting entity. For example, a user priority rating (e.g., a manually defined priority) and a priority value determined by analyzing the content of the communication can be simultaneously considered when determining the priority of a contacting entity. The priority of each factor can be weighted and summed to arrive at a finalized priority value. For example, assume a user defines an individual as having a priority value of 8. Further assume that the manually defined priority has a 60% weight. Also assume that the priority value of the individual is dynamically determined to be 4 based on an analysis of the content of the communication received from the individual. Further assume that the dynamically determined priority has a 40% weight. In this example, the finalized priority P of the individual would be calculated as $P=(priorityfactor_1 \times weight_1)+(priorityfactor_2 \times weight_2)$. As such, P would be calculated as 6.4 (e.g., $(8 \times 0.6)+(4 \times 0.4)=6.4$). It is noted that the above calculation is merely exemplary, and a finalized priority P calculated based on n factors with respective weightings can be generically calculated according to $P=(priorityfactor_1 \times weight_1)+(priorityfactor_2 \times weight_2)+ \ldots (priorityfactor_n \times weight_n)$.

Upon determining the priority of the contacting entity, the contacting entity is added to a queue based on their priority. This is illustrated at operation 320. For example, if a current queue includes "entity 1—priority 9, entity 5—priority 7, entity 3—priority 6, entity 2—priority 4, and entity 4—priority 1," if a sixth contacting entity "entity 6" is determined to have a priority of 5, then the new queue incorporating entity 6 would be "entity 1—priority 9, entity 5—priority 7, entity 3—priority 6, entity 6—priority 5, entity 2—priority 4, and entity 4—priority 1." As such, contacting entities are followed up with starting from the highest priority and ending with the lowest priority (e.g., in descending order).

Upon adding the contacting entity to the queue, a notification is transmitted to the contacting entity. This is illustrated at operation 325. The notification can be the same as, or substantially similar to, the notification transmitted at operation 225 of FIG. 2. In some embodiments, the notification can include an indication of the contacting entity's position in the queue. This can aid the contacting entity in ascertaining when they may be followed up with. In some embodiments, the notification transmitted at operation 325 can include an approximate time in which the contacting entity will be followed up with based on the contacting entity's position in the queue.

A determination is then made whether the user enters the geofence. This is illustrated at operation 330. This can be completed by determining whether the location (e.g., coordinates) of the user enter the virtual boundary defining the geofence. If a determination is made that the user has not entered the geofence, then operation 330 commences (e.g., the determination whether the user enters the geofence is continually performed).

If a determination is made that the user enters the geofence, then a follow-up action is executed to the next contacting entity in the queue. This is illustrated at operation 335. The follow-up action executed at operation 335 can be completed the same as, or substantially similar to, the follow-up action executed at operation 235 of FIG. 2.

Upon following up with the contacting entity at operation 335, a determination is made whether there is another contacting entity in the queue. This is illustrated at operation 340. If there is another contacting entity in the queue, operation 340 returns to operation 335, where the next contacting entity in the queue is followed up with. If there are no additional contacting entities in the queue, then method 300 ends.

The aforementioned operations can be completed in any order and are not limited to those described. Additionally, some, all, or none of the aforementioned operations can be completed, while still remaining within the spirit and scope of the present disclosure.

Figure 4:
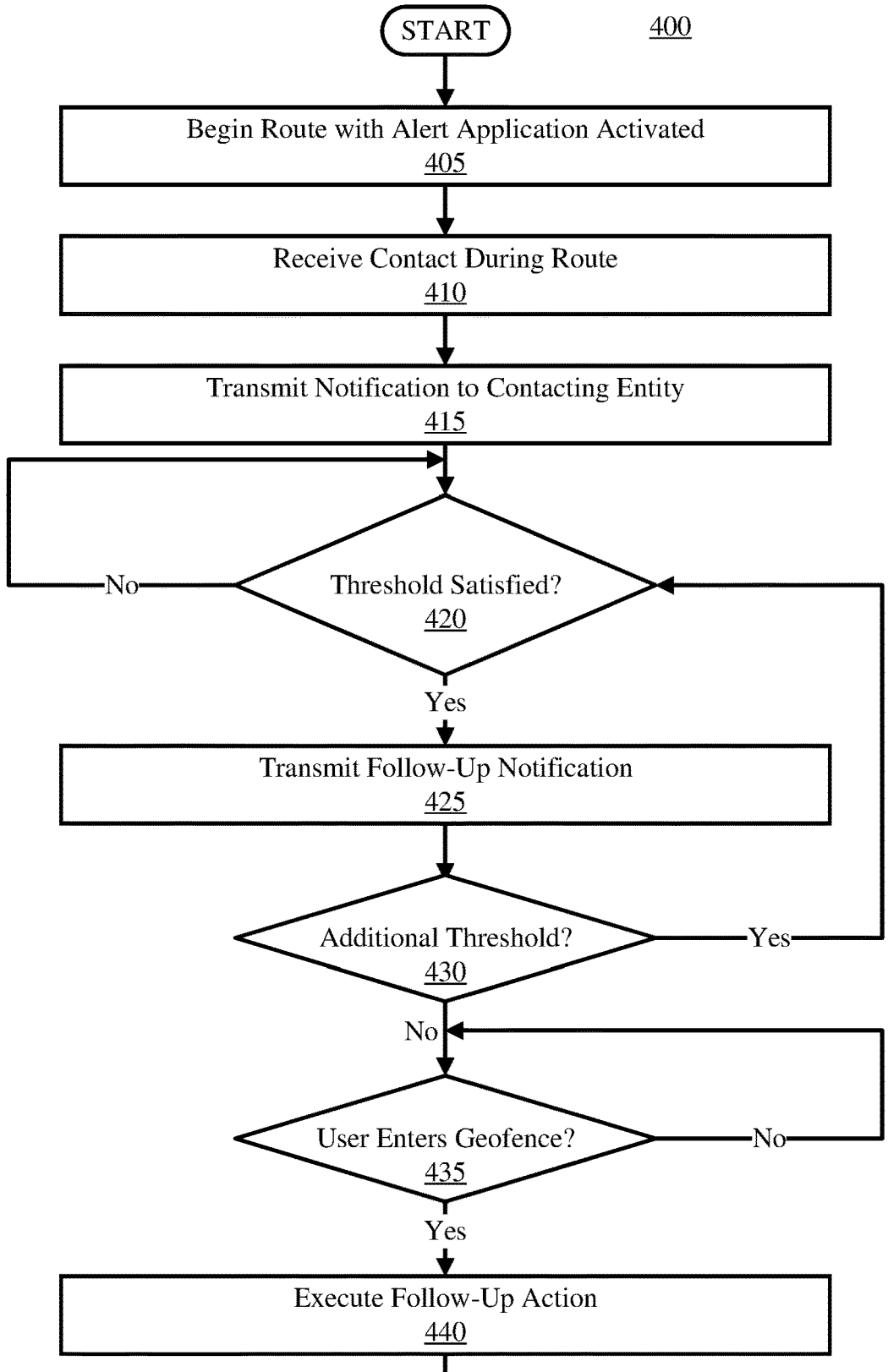
FIG. 4 is a flow diagram illustrating an example method for managing contact received while a user is traveling by following up with a contacting entity according to one or more thresholds, in accordance with embodiments of the present disclosure.

Referring now to FIG. 4, shown is a flow diagram illustrating an example method 400 for managing contact received while a user is traveling by following up with a contacting entity according to one or more thresholds, in accordance with embodiments of the present disclosure.

Method 400 initiates at operation 405, where a route is initiated while an alert application (e.g., alert application 160 of FIG. 1) is activated. When the alert application is in an active state, it may collect routing information, including, but not limited to, the location of the traveling user, the geofence of the destination the user is traveling to, paths from the user to the geofence, the ETA from the user to the geofence, the distance from the user to the geofence, and traffic data.

The alert application can also include one or more thresholds that dictate when follow-up actions are executed to contacting entities. This can be completed to update the contacting entity regarding the traveling user's location over time. This may enhance safety for the traveling user, as an external party can be periodically updated at various milestones along the user's travel. For example, periodic updates can enhance the safety for a user traveling during severe weather conditions (e.g., blizzards, thick fog, thunderstorms, etc.) or during a road trip. Thus, if the external party determines that the traveling user is not progressing as expected, emergency authorities can be contacted to aid the traveling user (e.g., if the user is stuck in snow, got in an accident, etc.) This additionally provides information to contacting entities such that they are aware of when the traveling user is likely to follow up.

Contact is then received during the route. This is illustrated at operation 410. This can be substantially similar to the contact received at operation 220 of FIG. 2.

The alert application then transmits a notification to the contacting entity. This is illustrated at operation 415. The notification can be the same as, or substantially similar to, the notification transmitted at operation 225 of FIG. 2 or operation 325 of FIG. 3.

In some embodiments, the notification can include an indication regarding when the alert application will follow up with the user according to one or more thresholds. For example, one or more thresholds that dictate when follow-up actions are executed to contacting entities may be defined. Thus, the notification at operation 415 can include an indication regarding when the user will be followed up with according to the defined threshold(s). As an example, if a threshold dictates that the alert application will follow up with contacting entities when the user is 30 minutes from the geofence, then the notification can include an indication that the contacting entity will be followed up with 30 minutes prior to arriving at the geofence.

A determination is then made whether a threshold defined in the alert application is satisfied. This is illustrated at operation 420. Various thresholds can be used to dictate follow-up actions. In some embodiments, estimated time of arrival (ETA) thresholds are used to trigger follow-up actions. In these embodiments, upon a threshold ETA from the geofence, a follow-up action is executed. For example, if an ETA threshold is defined as 5 minutes, then a follow-up action can be executed 5 minutes prior to arriving at the geofence. In this example, the threshold is considered satisfied when the ETA is 5 minutes.

In some embodiments, distance thresholds are used to trigger follow-up actions. In these embodiments, upon a distance threshold from the geofence, a follow-up action is executed. For example, if a distance threshold is defined as 10 miles, then a follow-up action can be executed when the user is 10 miles (e.g., within a 10 mile radius) from the geofence. In this example, the threshold is considered satisfied when the user is within 10 miles of the geofence.

In some embodiments, follow-up actions can be executed periodically (e.g., every 30 minutes, every hour, etc.). For example, a follow-up action can be automatically transmitted to a contacting entity every hour. In this example, the threshold is considered satisfied every hour throughout navigation.

If a determination is made that the threshold is satisfied, then a follow-up notification is transmitted to the contacting entity. This is illustrated at operation 425. Follow-up notifications can be the same as, or substantially similar to, notifications described with respect to operation 225 of FIG. 2, operation 325 of FIG. 3, or operation 415. For example, the follow-up notification can include a brief greeting, an ETA from the geofence, and an indication regarding the user's availability.

A determination is then made whether there are any additional thresholds. This is illustrated at operation 430. For example, multiple ETA thresholds can be defined for a single travel route. There may be thresholds defining follow-up action executions at 10 hours ETA, 5 hours ETA, 2 hours ETA, and 1 hour ETA. In this example, if only the 10 hour ETA follow-up threshold is satisfied (e.g., the user is within 10 hours of their destination, but not within 5 hours of their destination), then three ETA follow-up thresholds are still required to be satisfied. In this example, the determination at operation 430 is "No."

If there are any additional thresholds, then method 400 returns to operation 420, where a determination is made whether any of the additional thresholds are satisfied. This may be ongoing until the next threshold is satisfied.

If a determination is made that there are not any remaining thresholds, then method 400 progresses to operation 435, where a determination is made whether the user enters the geofence. This can be completed the same as, or substantially similar to, operation 230 of FIG. 2. If a determination is made that the user has not entered the geofence, then operation 435 commences (e.g., the determination whether the user enters the geofence is continually or intermittently performed).

If a determination is made that the user enters the geofence, then a follow-up action is executed. This is illustrated at operation 440. The follow-up action can be the same as, or substantially similar to, the follow-up actions described with respect to operation 235 of FIG. 2. Upon executing the follow-up action, method 400 ends.

The aforementioned operations can be completed in any order and are not limited to those described. Additionally, some, all, or none of the aforementioned operations can be completed, while still remaining within the spirit and scope of the present disclosure.

Figure 5:
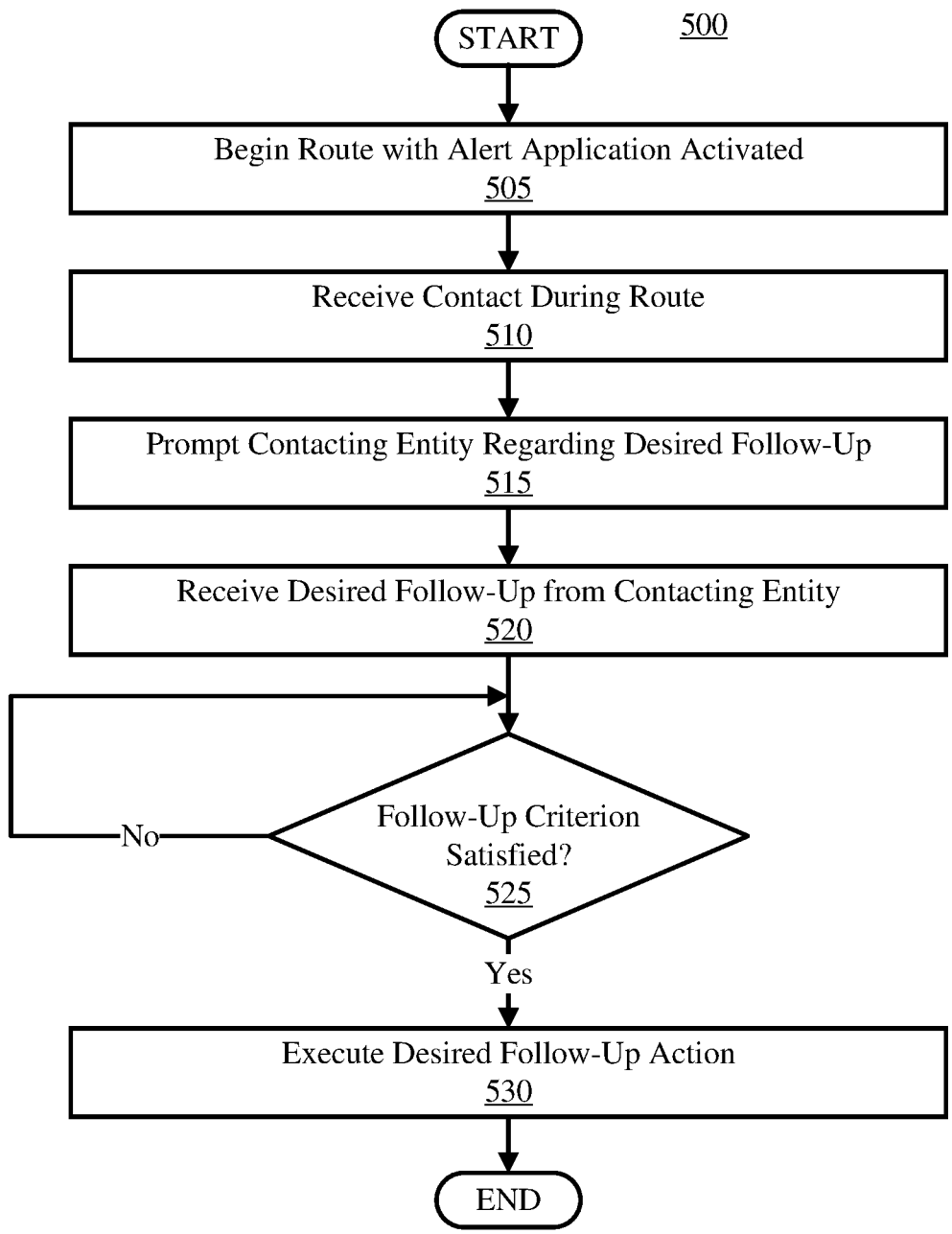
FIG. 5 is a flow diagram illustrating an example method for managing contact received while a user is traveling by prompting a contacting entity regarding a desired follow-up, in accordance with embodiments of the present disclosure.

Referring now to FIG. 5, shown is an example method for managing contact received during a route by prompting a contacting entity regarding a desired follow-up, in accordance with embodiments of the present disclosure.

Method 500 initiates at operation 505, where a route is initiated while an alert application (e.g., alert application 160 of FIG. 1) is activated. When the alert application is in an active state, it may collect routing information, including, but not limited to, the location of the traveling user, the geofence of the destination the user is traveling to, paths from the user to the geofence, the ETA from the user to the geofence, the distance from the user to the geofence, and traffic data. Further, the alert application may include any of the other functionalities described with respect to FIGS. 2-4 (e.g., prioritization techniques, thresholds for follow-ups, and natural language processing capabilities). In embodiments, the caller alert application can include contacting entity prompting capabilities, to be discussed with reference to operation 515.

Contact is then received during the route. This is illustrated at operation 510. The contact may be the same as, or substantially similar to, the contact received at operation 220 of FIG. 2.

Upon receiving the contact, the contacting entity is prompted regarding a desired follow-up. This is illustrated at operation 515. The contacting entity can be prompted in various manners. For example, the contacting entity can be prompted regarding their desired follow-up in a call, a text, or an email. The manner in which the contacting entity is prompted may mirror the type of contact received from the contacting entity. For example, if a call is received while the user is traveling, the alert application can be configured to prompt the contacting entity during the call. Similarly, if a text message is received while the user is traveling, the alert application can be configured to prompt the contacting entity via a text message.

The contacting entity can be prompted regarding the type of contact they would like to receive (e.g., a call, text, email, push notification, etc.), the time they would like to receive the communication (e.g., upon arrival at the geofence, 5 minutes prior to arriving at the geofence, within 10 miles of the geofence, etc.), and the content of the communication they would like to receive (e.g., an arrival time, a product number, a referral name, etc.).

In embodiments, the contacting entity can be prompted via a menu of options, which can be a default setting in the alert application or configurable by a user. For example, when a contacting entity calls the user while driving, the alert application can be configured to present a series (e.g., using an automated voice response system) of options regarding the contacting entity's desired follow-up on the call. The prompt can include a first query "What type of communication would you like to receive? Press 1 on the number pad for call . . . Press 2 on the number pad for text . . . or Press 3 on the number pad for email." Upon receiving input from the contacting entity, the prompt can include a second query "When would you like to receive the communication? Press 1 on the number pad for upon arrival . . . Press 2 on the number pad for within 5 minutes of arrival . . . or Press 3 on the number pad for 5 minutes after arrival." This can similarly be completed using the contacting entity's voice rather than a number pad response (e.g., using voice recognition techniques). The alert application can similarly prompt the contacting entity with a menu of options over text message or email (e.g., "What type of communication would you like to receive? Respond with "1" for call . . . Respond with "2" for text . . . or Respond with "3" for email.").

In embodiments, the selection of an option to one query may limit or otherwise modify the selection of a subsequent query. For example, following the example above, if a contacting entity selects "call" as their response to the first query, then the options for the second query may only include "upon arrival" and "5 minutes after arrival." This is because following up with a call 5 minutes prior to arriving may distract the traveling user, which is not advisable. Alternatively, if the user selects "text message," all three options may be available, as the alert application can be configured to transmit an automated message which avoids distracting the user prior to arrival. In some embodiments, additional queries may be presented based on answers to preceding queries. For example, following the example above, if a user selects "5 minutes prior to arrival" as their response to the second query, a third query can be presented reciting "What information would you like to receive prior to arrival? Press 1 for ETA . . . Press 2 for distance from destination . . . Press 3 for the user's location."

The desired follow-up is then received from the contacting entity. This is illustrated at operation 520. As discussed above, the contacting entity can respond to the prompt request initiated by the alert application. This response is stored and referred to at operation 525, where a determination is made whether a follow-up criterion is satisfied. For example, if a contacting entity requests that the user call the contacting entity upon arrival, the follow-up criterion is "upon arrival." Therefore, when the user reaches their destination (e.g., enters the perimeter of a geofence defining the destination), then a determination can be made that the follow-up criterion is satisfied. The requested follow-up action can then be executed. This is illustrated at operation 530. For example, if the contacting entity requested a call upon arrival, then upon determination that the follow-up criterion is satisfied at operation 525 (e.g., upon arrival), the alert application automatically calls the contacting entity.

This can be completed using any number and/or type of follow-up criteria and/or follow-up actions. As a detailed example, a contacting entity may request (e.g., by responding to a menu of options prompted by the alert application) that the user first transmits a text message indicating the user's ETA 30 minutes prior to arrival and later calls the contacting entity 5 minutes after arrival to the destination. In this example, a first follow-up criterion "30 minutes prior to arrival" triggers the execution of a first follow-up action "text message indicating ETA" while a second follow-up criterion "5 minutes after arrival" triggers the execution of a second follow-up action "call."

The aforementioned operations can be completed in any order and are not limited to those described. Additionally, some, all, or none of the aforementioned operations can be completed, while still remaining within the spirit and scope of the present disclosure.

It is noted that the various methods of managing contact disclosed with respect to FIGS. 2-5 can be combined while remaining within the spirit and scope of the present disclosure. That is, in embodiments, prioritizing between contacting entities, executing follow-ups based on thresholds, and prompting contacting entities regarding desired follow-ups can all be simultaneously completed.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
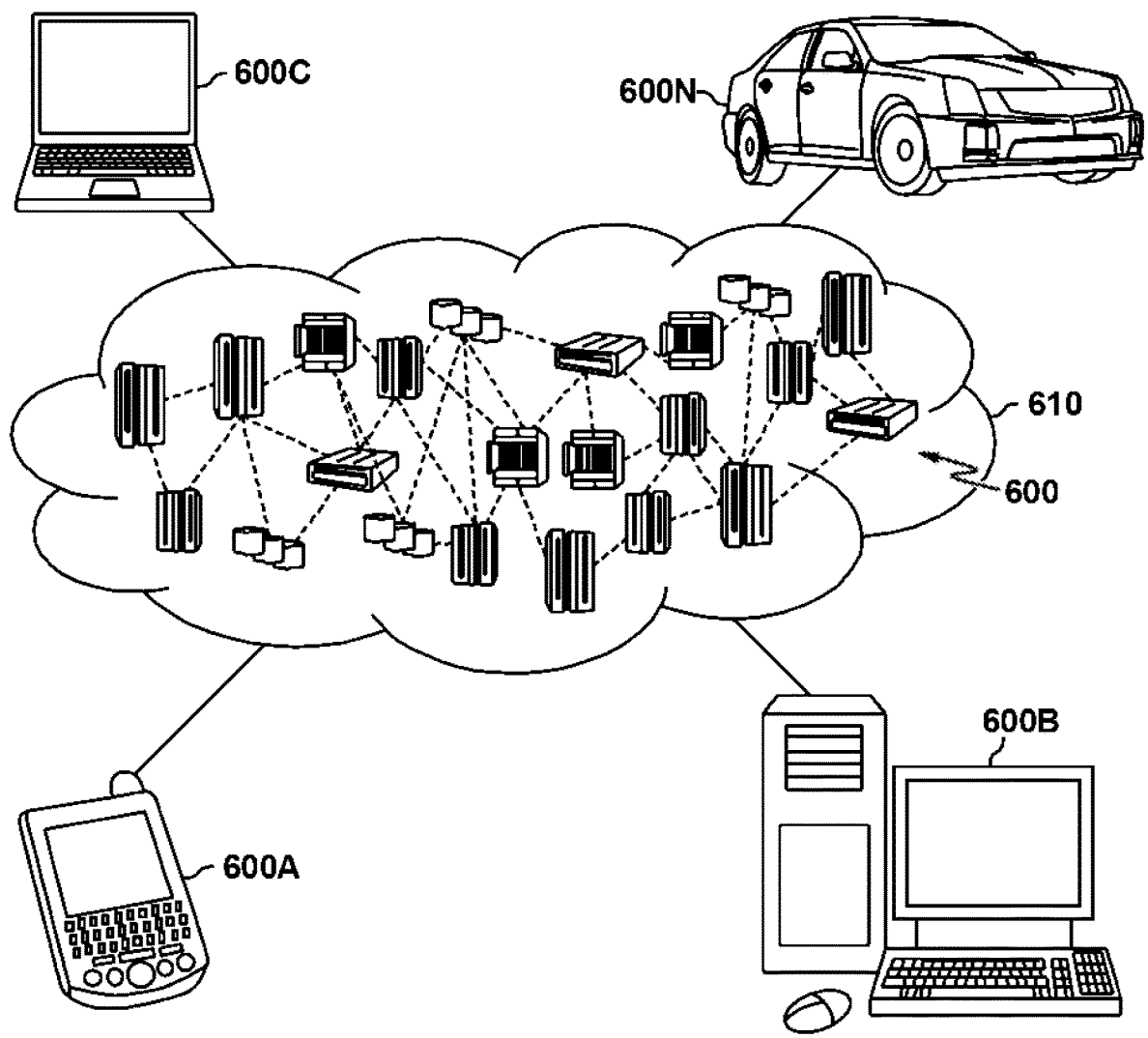
FIG. 6 is a diagram illustrating a cloud computing environment, in accordance with embodiments of the present disclosure.

Referring now to FIG. 6, illustrative cloud computing environment 610 is depicted. As shown, cloud computing environment 610 includes one or more cloud computing nodes 600 with which local computing devices used by cloud consumers, such as, for example, personal digital assistant (PDA) or cellular telephone 600A (e.g., devices 105 and server 135), desktop computer 600B (e.g., devices 105 and server 135) laptop computer 600C (e.g., devices 105 and server 135), and/or automobile computer system 600N can communicate. Nodes 600 can communicate with one another. They can be grouped (not shown) physically or virtually, in one or more networks, such as Private, Community, Public, or Hybrid clouds as described hereinabove, or a combination thereof. This allows cloud computing environment 610 to offer infrastructure, platforms and/or software as services for which a cloud consumer does not need to maintain resources on a local computing device. It is understood that the types of computing devices 600A-N shown in FIG. 6 are intended to be illustrative only and that computing nodes 600 and cloud computing environment 610 can communicate with any type of computerized device over any type of network and/or network addressable connection (e.g., using a web browser).

Figure 7:
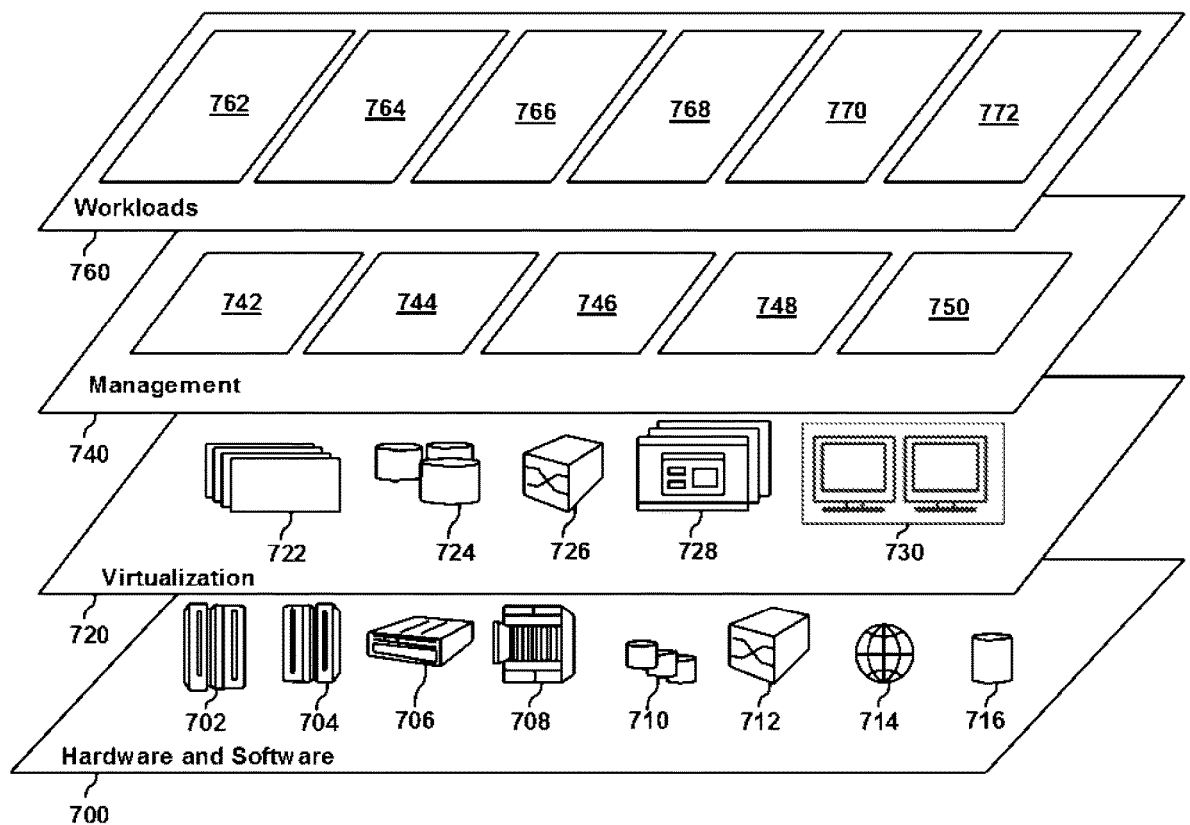
FIG. 7 is a block diagram illustrating abstraction model layers, in accordance with embodiments of the present disclosure.

Referring now to FIG. 7, a set of functional abstraction layers provided by cloud computing environment 610 (FIG. 6) is shown. It should be understood in advance that the components, layers, and functions shown in FIG. 7 are intended to be illustrative only and embodiments of the disclosure are not limited thereto. As depicted below, the following layers and corresponding functions are provided.

Hardware and software layer 700 includes hardware and software components. Examples of hardware components include: mainframes 702; RISC (Reduced Instruction Set Computer) architecture based servers 704; servers 706; blade servers 708; storage devices 710; and networks and networking components 712. In some embodiments, software components include network application server software 714 and database software 716.

Virtualization layer 720 provides an abstraction layer from which the following examples of virtual entities can be provided: virtual servers 722; virtual storage 724; virtual networks 726, including virtual private networks; virtual applications and operating systems 728; and virtual clients 730.

In one example, management layer 740 can provide the functions described below. Resource provisioning 742 provides dynamic procurement of computing resources and other resources that are utilized to perform tasks within the cloud computing environment. For example, resource provisioning 742 can allocate additional computing resources to devices (e.g., devices 105 and server 135) which are indicated to have high activity. Metering and Pricing 744 provide cost tracking as resources are utilized within the cloud computing environment, and billing or invoicing for consumption of these resources. In one example, these resources can include application software licenses. In some embodiments, Metering and Pricing 744 indicates the number of allotted licenses to machines in the system. Security provides identity verification for cloud consumers and tasks, as well as protection for data and other resources. User portal 746 provides access to the cloud computing environment for consumers and system administrators. Service level management 748 provides cloud computing resource allocation and management such that required service levels are met. Service Level Agreement (SLA) planning and fulfillment 750 provide pre-arrangement for, and procurement of, cloud computing resources for which a future requirement is anticipated in accordance with an SLA.

Workloads layer 760 provides examples of functionality for which the cloud computing environment can be utilized. Examples of workloads and functions which can be provided from this layer include: mapping and navigation 762; image processing 764; natural language processing 766; classification 768; transaction processing 770; and data analytics processing 772.

Figure 8:
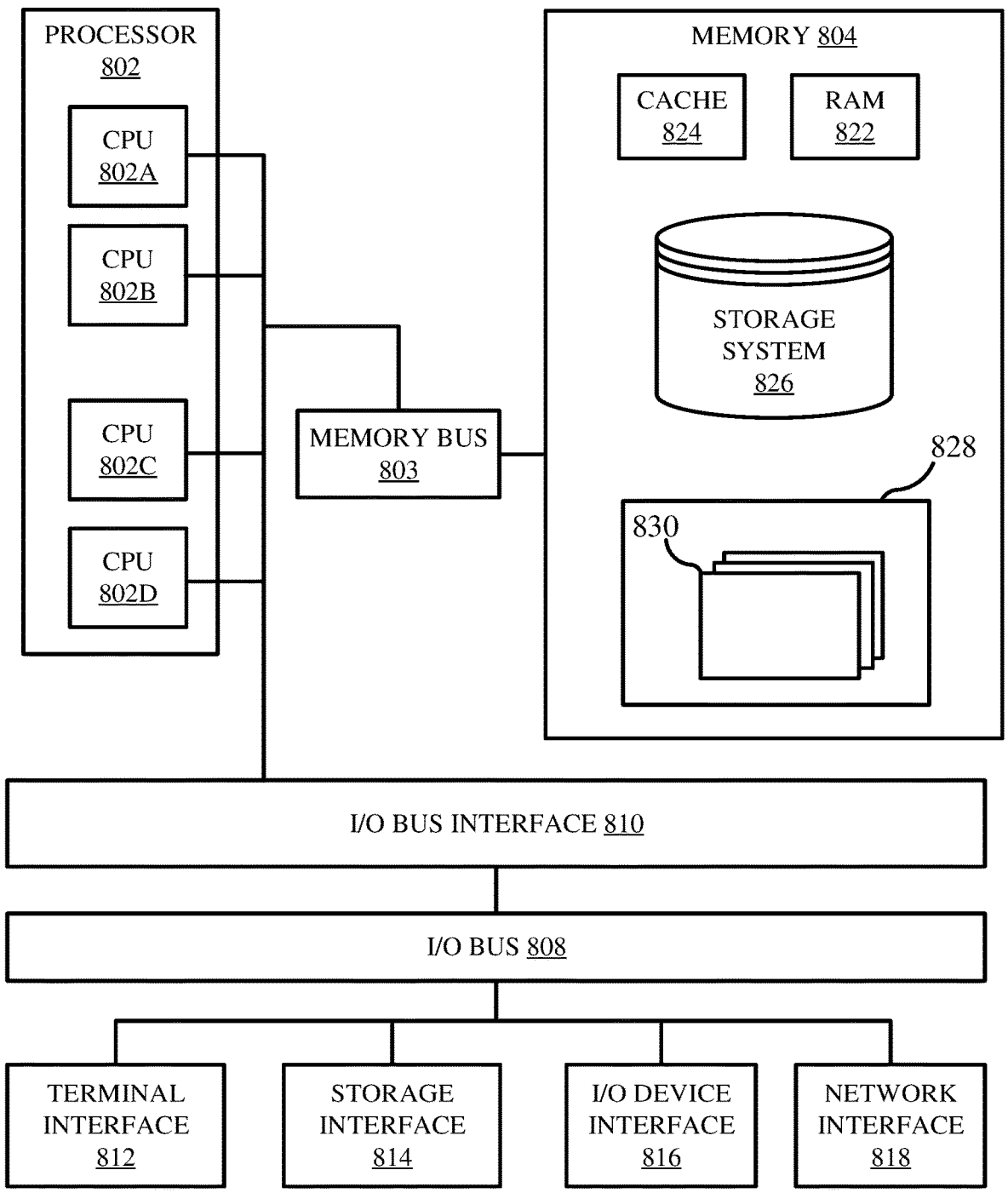
FIG. 8 is a high-level block diagram illustrating an example computer system that can be used in implementing one or more of the methods, tools, and modules, and any related functions, described herein, in accordance with embodiments of the present disclosure.

Referring now to FIG. 8, shown is a high-level block diagram of an example computer system 801 (e.g., devices 105 and server 135) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 801 may comprise one or more CPUs 802, a memory subsystem 804, a terminal interface 812, a storage interface 814, an I/O (Input/Output) device interface 816, and a network interface 818, all of which may be communicatively coupled, directly or indirectly, for inter-component communication via a memory bus 803, an I/O bus 808, and an I/O bus interface unit 810.

The computer system 801 may contain one or more general-purpose programmable central processing units (CPUs) 802A, 802B, 802C, and 802D, herein generically referred to as the CPU 802. In some embodiments, the computer system 801 may contain multiple processors typical of a relatively large system; however, in other embodiments the computer system 801 may alternatively be a single CPU system. Each CPU 802 may execute instructions stored in the memory subsystem 804 and may include one or more levels of on-board cache.

System memory 804 may include computer system readable media in the form of volatile memory, such as random access memory (RAM) 822 or cache memory 824. Computer system 801 may further include other removable/non-removable, volatile/non-volatile computer system storage media. By way of example only, storage system 826 can be provided for reading from and writing to a non-removable, non-volatile magnetic media, such as a "hard-drive." Although not shown, a magnetic disk drive for reading from and writing to a removable, non-volatile magnetic disk (e.g., a "USB thumb drive" or "floppy disk"), or an optical disk drive for reading from or writing to a removable, non-volatile optical disc such as a CD-ROM, DVD-ROM or other optical media can be provided. In addition, memory 804 can include flash memory, e.g., a flash memory stick drive or a flash drive. Memory devices can be connected to memory bus 803 by one or more data media interfaces. The memory 804 may include at least one program product having a set (e.g., at least one) of program modules that are configured to carry out the functions of various embodiments.

One or more programs/utilities 828, each having at least one set of program modules 830 may be stored in memory 804. The programs/utilities 828 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment.

Programs/utilities 828 and/or program modules 830 generally perform the functions or methodologies of various embodiments.

In some embodiments, the program modules 830 of the computer system 801 include an alert module. The alert module can be configured to receive contact from a contacting entity while a user is traveling to a geofence. The alert module can further be configured to determine whether the user enters the geofence. The alert application can further be configured to execute a follow-up action in response to a determination that the user enters the geofence.

Although the memory bus 803 is shown in FIG. 8 as a single bus structure providing a direct communication path among the CPUs 802, the memory subsystem 804, and the I/O bus interface 810, the memory bus 803 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 810 and the I/O bus 808 are shown as single respective units, the computer system 801 may, in some embodiments, contain multiple I/O bus interface units 810, multiple I/O buses 808, or both. Further, while multiple I/O interface units are shown, which separate the I/O bus 808 from various communications paths running to the various I/O devices, in other embodiments some or all of the I/O devices may be connected directly to one or more system I/O buses.

In some embodiments, the computer system 801 may be a multi-user mainframe computer system, a single-user system, or a server computer or similar device that has little or no direct user interface, but receives requests from other computer systems (clients). Further, in some embodiments, the computer system 801 may be implemented as a desktop computer, portable computer, laptop or notebook computer, tablet computer, pocket computer, telephone, smart phone, network switches or routers, or any other appropriate type of electronic device.

It is noted that FIG. 8 is intended to depict the representative major components of an exemplary computer system 801. In some embodiments, however, individual components may have greater or lesser complexity than as represented in FIG. 8, components other than or in addition to those shown in FIG. 8 may be present, and the number, type, and configuration of such components may vary.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method comprising:
    receiving, at a device of a user, contact from a contacting entity while the user is traveling to a geofence, the geofence being a virtual boundary defining a destination;
    determining a priority level of the contacting entity;
    adding the contacting entity to a contacting entity queue based on the priority level;
    determining that the user enters the geofence;
    determining, in response to determining that the user enters the geofence, whether the contacting entity is a next contacting entity in the contacting entity queue; and
    executing, in response to determining that the contacting entity is the next contacting entity in the contacting entity queue, a follow-up action to the contacting entity.

2. The method of claim 1, wherein the priority level of the contacting entity is manually defined by the user.

3. The method of claim 1, wherein the priority level is determined by:
    parsing, using a natural language processor, content of the contact received from the contacting entity;
    determining that at least one word in the content of the contact is included in a table mapping words to priority levels; and
    defining the priority level according to a priority level mapped to the at least one word in the table.

4. The method of claim 1, wherein the priority level is determined by:
    parsing, using a natural language processor, content of the contact received from the contacting entity;
    determining a sentiment of the content received from the contacting entity; and defining the priority level according to the sentiment of the content.

5. The method of claim 1, wherein the priority level is determined by:
receiving a first priority factor manually defined by the user, the first priority factor having a first weight;
receiving a second priority factor that is dynamically determined based on a content of the contact received by the contacting entity, the second priority factor having a second weight; and
adding a product of the first priority factor and the first weight with a product of the second priority factor and the second weight.

6. The method of claim 1, wherein in response to adding the contacting entity to the contacting entity queue based on the priority level, a notification is transmitted to the contacting entity indicating the contacting entity's position in the contacting entity queue.

7. A computer program product comprising a computer readable storage medium having program instructions embodied therewith, wherein the computer readable storage medium is not a transitory signal per se, the program instructions executable by a processor to cause the processor to perform a method comprising:
receiving, at a device of a user, contact from a contacting entity while the user is traveling to a geofence, the geofence being a virtual boundary defining a destination;
determining whether a threshold is satisfied, the threshold dictating a condition required to trigger a follow-up notification prior to the user arriving at the geofence;
transmitting, in response to determining that the threshold is satisfied, the follow-up notification to the contacting entity;
determining whether the user enters the geofence; and
executing, in response to determining that the user enters the geofence, a follow-up action.

8. The computer program product of claim 7, wherein the threshold is an estimated time of arrival (ETA) threshold and wherein the follow-up notification is transmitted to the contacting entity in response to an ETA of the user to the geofence being within the ETA threshold.

9. The computer program product of claim 8, wherein the follow-up notification includes a distance between the user and the geofence.

10. The computer program product of claim 7, wherein the threshold is a distance threshold and wherein the follow-up notification is transmitted to the contacting entity in response to a distance of the user to the geofence being within the distance threshold.

11. The computer program product of claim 10, wherein the follow-up notification includes an estimated time of arrival (ETA) of the user to the geofence.

12. The computer program product of claim 7, wherein the threshold is an estimated time of arrival (ETA) threshold specifying a first ETA, wherein the follow-up notification is transmitted to the contacting entity in response to an ETA from the user to the geofence being within the first ETA, wherein prior to determining whether the user enters the geofence, the method performed by the processor further comprises:
determining whether a second ETA threshold is satisfied, the second ETA threshold dictating a second condition required to trigger a follow-up notification prior to the user arriving at the geofence; and
transmitting, in response to determining that an ETA from the user to the geofence is within the second ETA, a second follow-up notification to the contacting entity.

13. The computer program product of claim 12, wherein the follow-up notification is a text message indicating a distance between the user and the geofence and wherein the second follow-up notification is a text message indicating a speed of the user.

14. The computer program product of claim 7, wherein in response to receiving contact from the contacting entity, a notification is transmitted to the contacting entity indicating the threshold.

15. A system comprising:
a first device of a user communicatively coupled to a second device of a contacting entity, the first device configured to perform a method comprising:
receiving, at the first device, contact from the second device while the user is traveling to a geofence, the geofence being a virtual boundary defining a destination;
prompting, by the first device, the contacting entity of the second device regarding a desired follow-up;
receiving an indication of the desired follow-up from the second device;
determining whether a follow-up criterion for executing the desired follow-up is satisfied; and
executing, in response to determining that the follow-up criterion for executing the desired follow-up is satisfied, the desired follow-up.

16. The system of claim 15, wherein the contact received from the second device is a call, wherein the second device is prompted regarding the desired follow-up during the call, wherein the prompting includes presenting a series of options to the contacting entity.

17. The system of claim 16, where the series of options includes a type of communication the contacting entity desires to receive, a time the contacting entity desires to receive the communication, and a content of the communication.

18. The system of claim 16, wherein in response to receiving a response to a first option of the series of options from the contacting entity, a second option subsequent to the first option is modified.

19. The system of claim 16, wherein in response to receiving a response to a first option of the series of options, an additional option is appended to the series of options.

20. The system of claim 15, wherein the desired follow up is a text message, wherein the follow-up criterion is a first estimated time of arrival (ETA) between the user and the geofence, wherein the follow-up criterion is satisfied when the user is within the first ETA of the geofence.

* * * * *